US008707016B2

(12) United States Patent
Arimilli et al.

(10) Patent No.: US 8,707,016 B2
(45) Date of Patent: *Apr. 22, 2014

(54) THREAD PARTITIONING IN A MULTI-CORE ENVIRONMENT

(75) Inventors: Ravi K. Arimilli, Austin, TX (US); Juan C. Rubio, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1508 days.

This patent is subject to a terminal disclaimer.

(21) Appl. No.: 12/024,211

(22) Filed: Feb. 1, 2008

(65) Prior Publication Data

US 2010/0299496 A1 Nov. 25, 2010

(51) Int. Cl.
G06F 9/30 (2006.01)

(52) U.S. Cl.
USPC .......................................................... 712/220

(58) Field of Classification Search
USPC .......................................................... 712/220
See application file for complete search history.

(56) References Cited

U.S. PATENT DOCUMENTS

| 5,933,627 | A | 8/1999 | Parady |
| 2003/0233394 | A1 | 12/2003 | Rudd et al. |
| 2004/0054990 | A1 | 3/2004 | Liao et al. |
| 2004/0154011 | A1 | 8/2004 | Wang et al. |
| 2004/0216102 | A1 | 10/2004 | Floyd |
| 2005/0071841 | A1 | 3/2005 | Hoflehner et al. |
| 2005/0223199 | A1* | 10/2005 | Grochowski et al. ......... 712/235 |
| 2005/0278487 | A1 | 12/2005 | Blandy |
| 2006/0155963 | A1 | 7/2006 | Bohrer et al. |
| 2007/0022422 | A1 | 1/2007 | Tirumalai et al. |
| 2007/0088915 | A1 | 4/2007 | Archambault et al. |
| 2007/0226465 | A1 | 9/2007 | Chaudhry et al. |

OTHER PUBLICATIONS

Galvin, Peter. Silberschatz, Abraham. "Operating system Concepts". Addison-Wesley Publishing Company, Fourth Edition, 1995. pp. 111-116.*

Aamodt, T. et al, "A Framework for Modeling and Optimization of Prescient Instruction Prefetch," Sigmetrics'03, Jun. 10-14, 2003, San Diego, California, USA, pp. 13-24.

Wang, P. et al, "Helper Threads Via Virtual Multithreading on an Experimental Itanium 2 Processor-Based Platform," ASPLOS'04, Oct. 9-13, 2004, Boston, Massachusetts, USA, pp. 144-155.

Aamodt, T. et al, "Optimization of Data Prefetch Helper Threads With Path-Expression Based Statistical Modeling," ICS'07, Jun. 18-20, 2007, Seattle, Washington, USA, pp. 210-221.

(Continued)

Primary Examiner — Robert Fennema
(74) Attorney, Agent, or Firm — Yudell Isidore Ng Russell PLLC

(57) ABSTRACT

A set of helper thread binaries is created to retrieve data used by a set of main thread binaries. The set of helper thread binaries and the set of main thread binaries are partitioned according to common instruction boundaries. As a first partition in the set of main thread binaries executes within a first core, a second partition in the set of helper thread binaries executes within a second core, thus "warming up" the cache in the second core. When the first partition of the main completes execution, a second partition of the main core moves to the second core, and executes using the warmed up cache in the second core.

14 Claims, 6 Drawing Sheets

(56) References Cited

OTHER PUBLICATIONS

Shayetesh, A. et al, "Improving the Performance and Power Efficiency of Shared Helpers in CMPS," CASES'06, Oct. 23-25, 2006, Seoul, Korea, pp. 345-356.

Lu, J. et al, "Dynamic Helper Threaded Prefetching on the Sun Ultrasparc CMP Processor," Proceedings of the 38th Annual IEEE/ACM International Symposium on Microarchitecture (MICRO'05), 2005, pp. 1-12.

Ku, W. et al, "Collaborative Multithreading: An Open Scalable Processor Architecture for Embedded Multimedia Applcations," ICME 2006, pp. 25-28.

Kim, D. et al, "Design and Evaluation of Compiler Algorithms for Pre-Execution," ASPLOS X, Oct. 2002, San Jose, California, USA, pp. 159-170.

Choi, S. et al, "A General Framework for Prefetch Scheduling in Linked Data Structures and Its Application to Multi-Chain Prefetching," ACM Transactions on Computer Systems, vol. 22, No. 2, May 2004, pp. 214-280.

Kim, D. et al, "A Study of Source-Level Compiler Algorithms for Automatic Construction of Pre-Execution Code, " ACM Transactions on Computer Systems, vol. 22, No. 3, Aug. 2004, pp. 326-379.

Arimilli, et al., "General Purpose Register Cloning," U.S. Appl. No. 12/024,198, Office Action dated Mar. 9, 2011.

* cited by examiner

THREAD PARTITIONING IN A MULTI-CORE ENVIRONMENT

This invention was made with United States Government support under Agreement No. HR0011-07-9-0002 awarded by DARPA. The Government has certain rights in the invention.

BACKGROUND OF THE INVENTION

1. Technical Field

The present invention relates in general to computers, and in particular to computer software. Still more particularly, the present invention relates to a system, method and computer program product for partitioning a main dread and a helper thread for execution division among multiple cores.

2. Description of the Related Art

A computer can be viewed, in a simple perspective, as a set of hardware that manipulates data by executing instructions from an application, all under the control of an operating system. The application is a collection of all software needed to perform a task from a user's point of view. This includes the main thread(s) of executable binaries derived from the main thread. The executable binaries are groups of instructions that are loaded into execution units and other logic in a core of a processor in the computer.

When a user decides to run an application, the operating system loads the executable binaries into a region of memory, called the "code space." An instruction fetch unit then starts executing code, from the code space, to manipulate data from local registers and/or data caches. To optimize execution efficiency, the data to be manipulated needs to be readily available.

SUMMARY OF THE INVENTION

A set of helper thread binaries is created to retrieve data used by a set of main thread binaries. The set of helper thread binaries and the set of main thread binaries are partitioned according to common instruction boundaries. As a first partition in the set of main thread binaries executes within a first core, a second partition in the set of helper thread binaries executes within a second core, thus "warming up" the cache in the second core. When the first partition of the main thread completes execution, a second partition of the main core moves to the second core for execution using the warmed up cache in the second core.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed descriptions of an illustrative embodiment when read in conjunction with the accompanying drawings, wherein:

DETAILED DESCRIPTION OF THE PREFERRED EMBODIMENT

Figure 1:
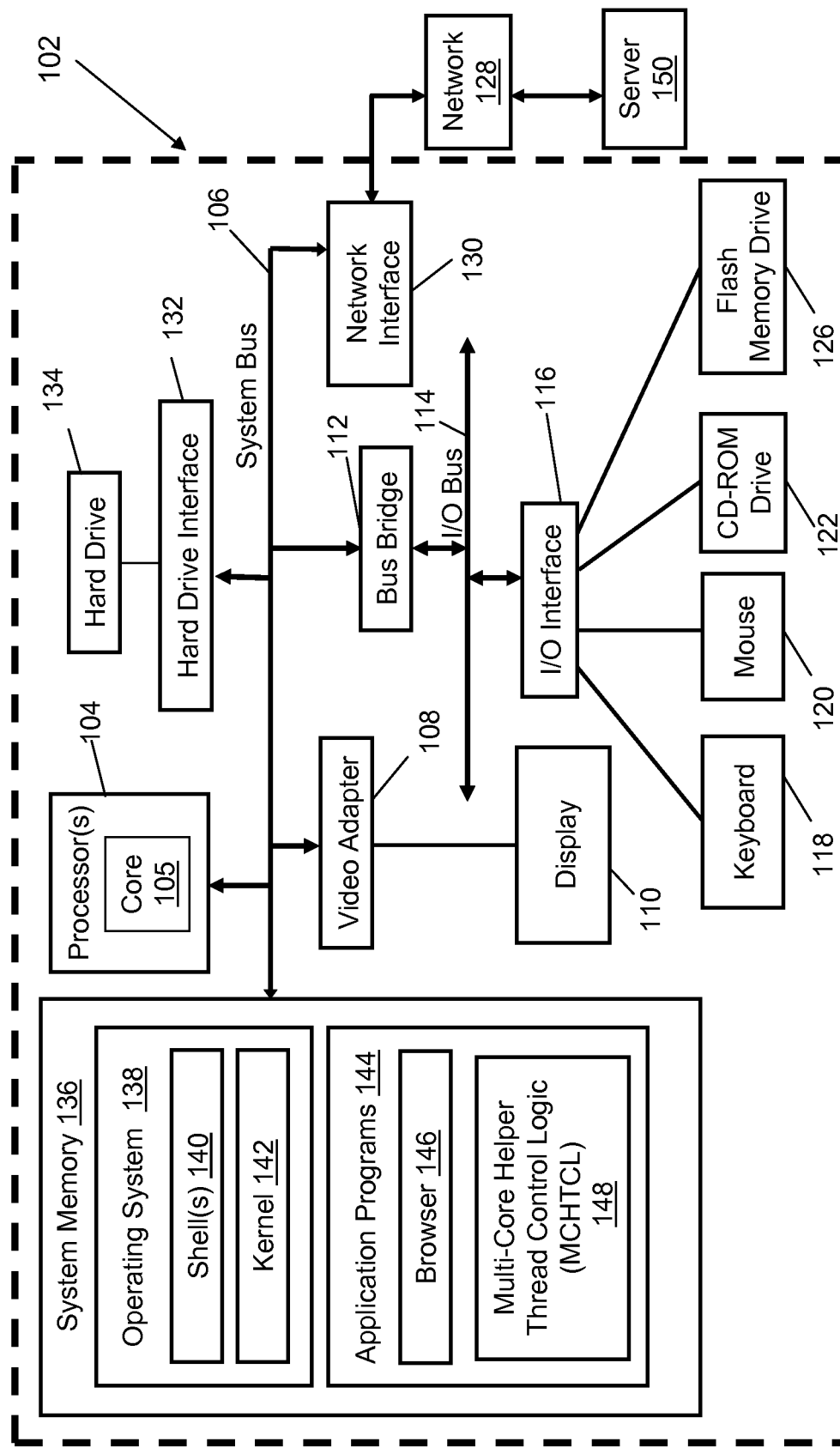
FIG. 1 is a block diagram of a data processing system in which the present invention may be implemented.

With reference now to FIG. 1, there is depicted a block diagram of an exemplary computer 100 in which the present invention may be implemented. Computer 102 includes one or more processors 104 that are coupled to a system bus 106. Each processor 104 may have one or more cores 105. If computer 102 has multiple processors 104, then computer 102 is referred to as a multi-processor computer. If a processor 104 has multiple cores 105, then processor 104 is referred to as a multi-core processor. Note that computer 102 may use single-core processors, multi-core processors, or a combination of single-core and multi-core processors.

A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Computer 102 is able to communicate with a software deploying server 150 via a network 128 using a network interface 130, which is coupled to system bus 106. Network 128 may be an external network such as the Internet, or an internal network such as an Ethernet or a Virtual Private Network (VPN). Note the software deploying server 150 may utilize a same or substantially similar architecture as computer 102.

A hard drive interface 132 is also coupled to system bus 106. Hard drive interface 132 interfaces with a hard drive 134. In a preferred embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140 (also called a command processor) is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which provides lower levels of functionality for OS 138 and application programs 144, including memory management, process and task management, disk management, network management and power and mouse and keyboard management.

Application programs 144 include a browser 146. Browser 146 includes program modules and instructions enabling a World Wide Web (WWW) client (i.e., computer 102) to send and receive network messages to the Internet using Hyper-Text Transfer Protocol (HTTP) messaging, thus enabling communication with software deploying server 150.

Application programs 144 in computer 102's system memory (as well as software deploying server 150's system memory) also include a Multi-Core Helper Thread Control Logic (MCHTCL) 148. MCHTCL 148 includes code for implementing the processes described in FIGS. 2-6. In one embodiment, computer 102 is able to download MCHTCL 148 from software deploying server 150, including in an "on demand" basis, as described in greater detail below in FIGS. 2-6.

The hardware elements depicted in computer 102 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
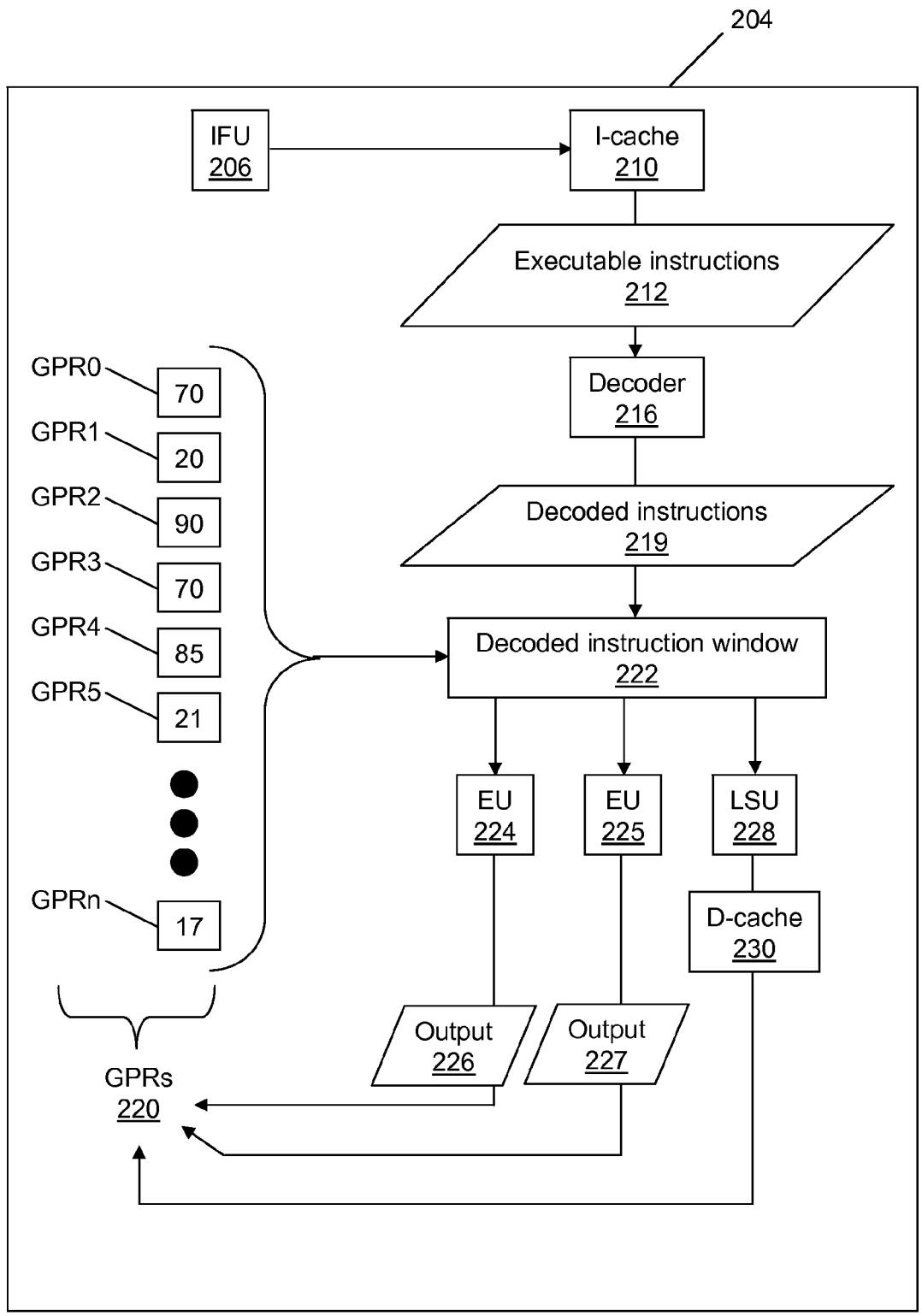
FIG. 2 depicts additional detail of a processor core used by the data processing system shown in FIG. 1.

With reference now to FIG. 2, additional detail of a processor core 204 (an example of one of the one or more cores 105 depicted in FIG. 1) is presented. Note that processor core 204 has other features and components beyond those depicted in FIG. 2. While such other features and components are known to those skilled in the art of computer architecture design, depicting these other features and components is not necessary to understand the operation of the present invention, and thus such features and components are omitted for the sake of clarity.

Processor core 204 includes an Instruction Fetch Unit (IFU) 206, which fetches a next instruction from an instruction cache (I-cache) 210. It is to be understood that an instruction is code that, after being decoded in a manner such as that described below, is executable by an execution unit in a core. That is, source code is compiled to create object code, and object code is linked by a linker to create binaries, and binaries are used by a decoder to control the operation of an execution unit within the processor core 204. If I-cache 210 does not contain the requisite instructions, then those needed instructions are retrieved from lower levels of cache and/or system memory.

Thus, I-cache 210 sends executable instructions 212, which have been identified by the IFU 206, to an instruction decoder 216. The instruction decoder 216 determines what actions need to occur during the execution of the instructions 212, as well as which General Purpose Register (GPR) 220 holds needed data. The GPRs 220 are depicted as GPR0 through GPRn, where "n" is an integer (e.g., n=31). In the example shown, GPR0 contains the value "70" while GPR1 contains the value "20", etc. The decoded instructions 219 and data from the GPRs 220 are buffered in a decoded instruction window 222, while they await previous operations to complete and results to become available. Once the inputs for the instruction in the decoded instruction window 222 become available they are sent to an Execution Unit (EU) 224.

EU 224 may be a Fixed Point Execution Unit (FXU), a Floating Point Execution Unit (FPU), a Branch Execution Unit (BXU), or any other similar type of execution unit found in a processor core.

After executing the decoded instruction 222, the EU 224 sends the resultant output 226 into a particular GPR in the GPRs 220. The value of a GPR can also be sent to a Load/Store Unit (LSU) 228, which stores that value into a data cache (D-cache) 230.

In one embodiment, processor core 204 has multiple execution units, including EU 224 and EU 225. While the main thread binaries and helper thread binaries described herein may utilize a common IFU 206, instruction decoder 216, GPR's 220, LSU 228, and/or D-cache 230, the output 226 from EU 224 may be from execution of the main thread binaries, while the output 227 from EU 225 may be from execution of the helper thread binaries.

Figure 3:
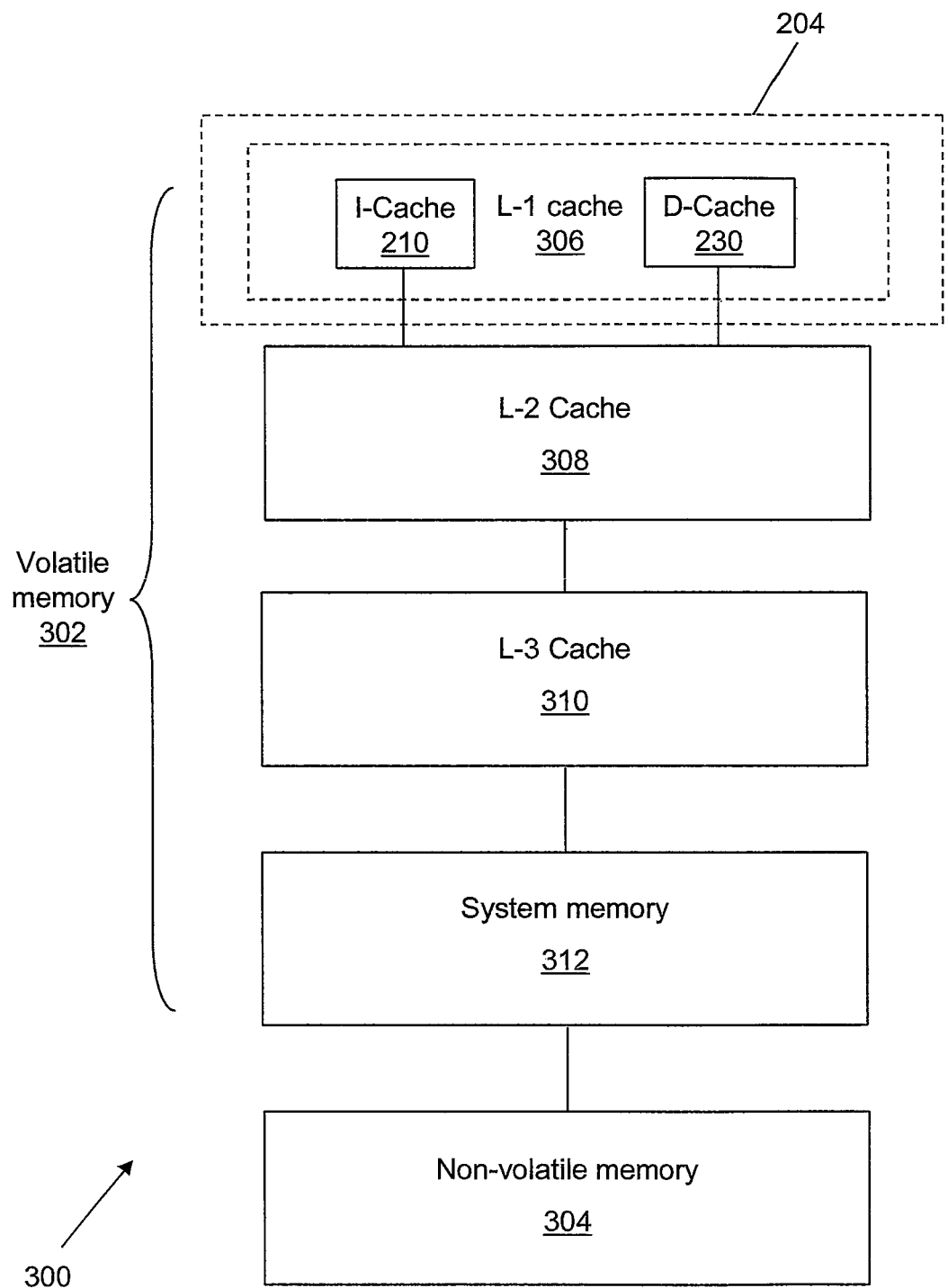
FIG. 3 illustrates a memory hierarchy used in the present invention.

With reference now to FIG. 3, a memory hierarchy 300 as utilized by the present invention is illustrated. Memory hierarchy 300 includes volatile memory 302 (memory that loses data when power is turned off) and non-volatile memory 304 (memory that is stored on a permanent medium that retains the data even after power is turned off). Within processor core 204 are level-one (L-1) cache 306, which includes I-cache 210 and D-cache 230 depicted in FIG. 2. In one embodiment, level-two (L-2) cache 308 and level-three (L-3) cache 310, as well as system memory 312 and non-volatile memory 304, are outside of processor core 204. In another embodiment, however, L-2 cache 308 and L-3 cache 310 are part of processor core 204. While the highest level of cache (L-1 cache 306) is the "fastest" (requiring only one or two clock cycles to retrieve data), L-1 cache 306 is also the smallest. Thus, if data is not within the L-1 cache 306, then that data must be pulled from the L-2 cache 308 (which is larger than the L-1 cache 306, but requires an order of magnitude more clock cycles to retrieve the needed data). Similarly, the L-3 cache 310 is yet larger and slower than the L-2 cache 308, the system memory 312 (e.g., Dynamic Random Access Memory-DRAM) is larger and slower than the L-3 cache 310, and the non-volatile memory 304 (e.g., a hard drive) is larger and slower than the system memory. Nonetheless, a request for data continues down the memory hierarchy 300 until the data is found. When the data is found, it is then loaded into the highest available level of memory (i.e., L-1 cache 306). Populating the L-1 cache 306 or the L-2 or lower caches (308, 310) with needed data is known as "warming up" the cache.

Figure 4:
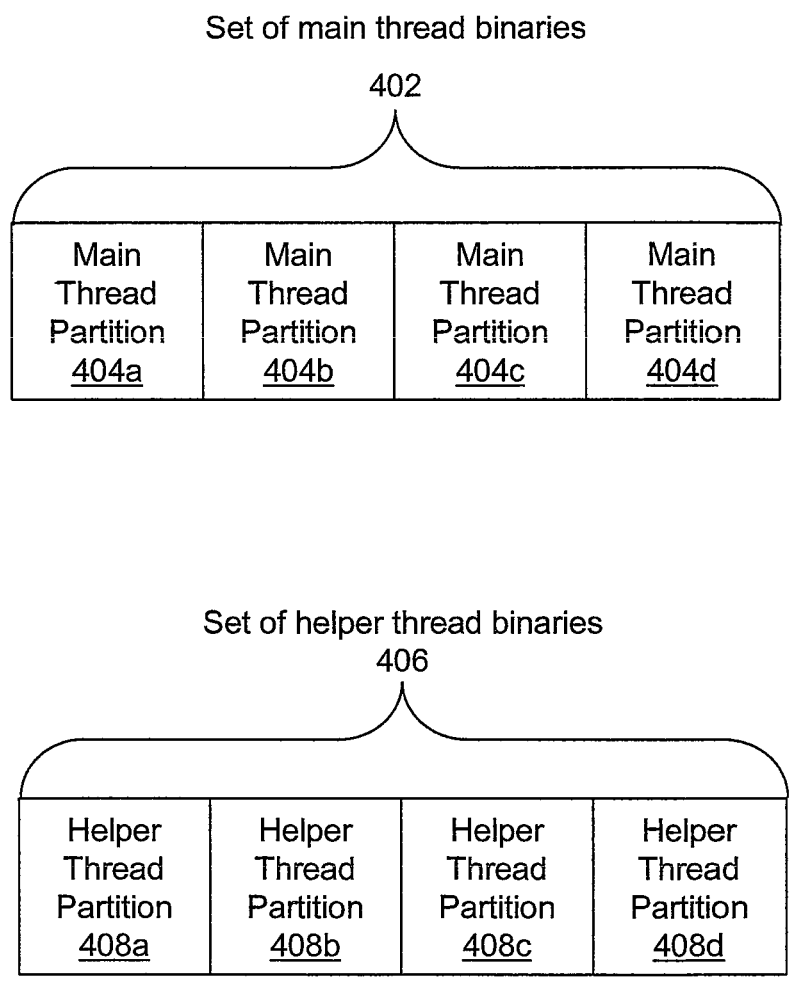
FIG. 4 depicts a partitioning of a set of main thread binaries and a set of helper thread binaries.

With reference now to FIG. 4, partitioned binaries, as contemplated by the present process, are depicted. A set of main thread binaries 402, which are executable instructions that can be directly processed by one or more execution units in a processor core, is partitioned into multiple main thread partitions (depicted as main thread partitions 404a-d, although any number of partition numbers may be selected and utilized). A set of helper thread binaries 406, which in one embodiment is an exact copy of the set of main thread binaries 402, is partitioned into multiple helper thread partitions (depicted as helper thread partitions 408a-d). Note that each partition in the main thread and helper thread partitions may start at the same instruction point in a process thread. That is, both main thread partition 404a and helper thread partition 408a start with "Instruction A," while both main thread partition 404b and helper thread partition 408b start with "Instruction B," etc.

Figure 5:
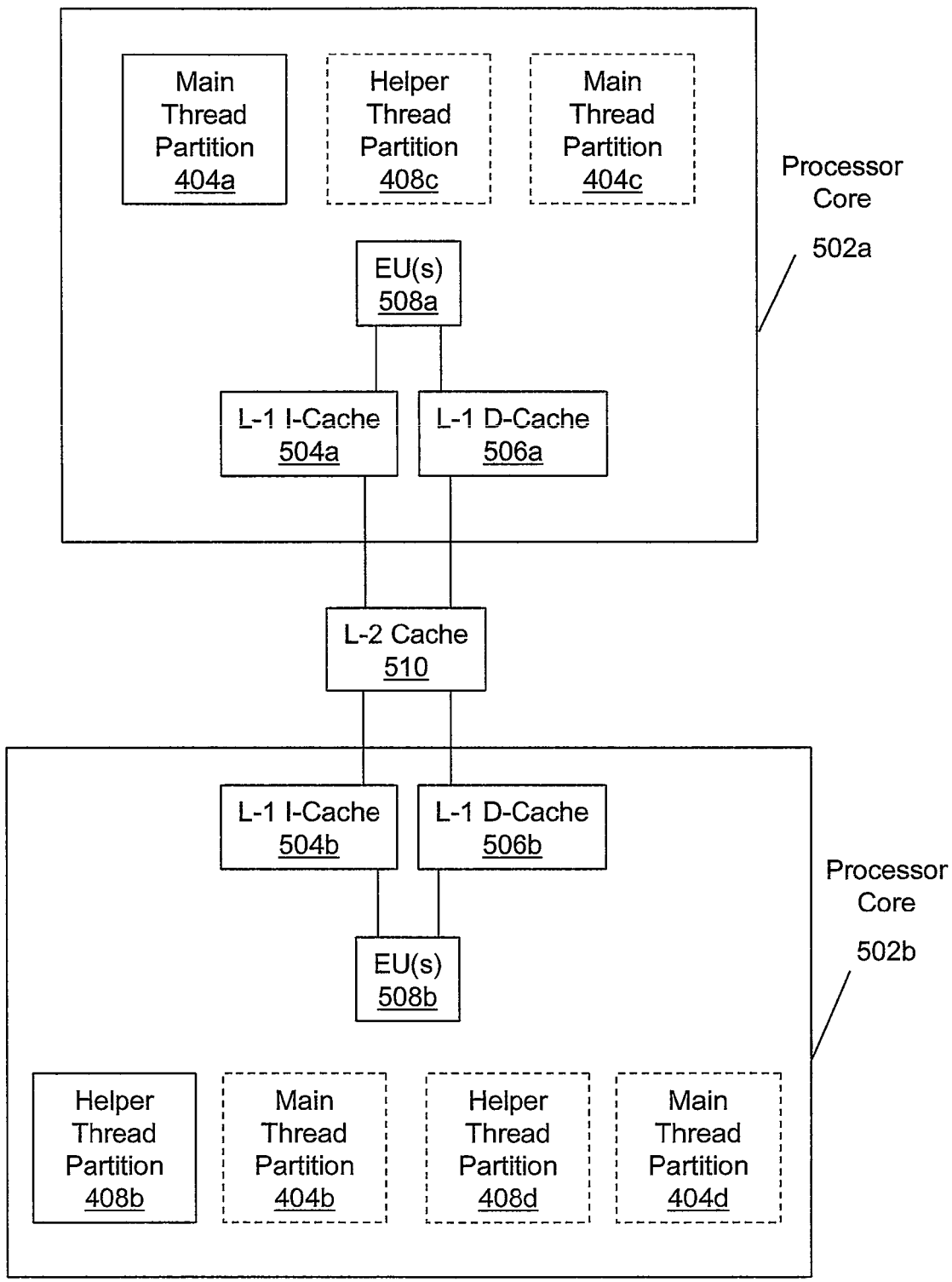
FIG. 5 illustrates an exemplary use of two cores to run partitions of the sets of main and helper thread binaries shown in FIG. 4.

Referring now to FIG. 5, assume the use of two processor cores: 502a and 502b. Processor cores 502a-b may be in a same processor or in different processors. Processor core 502a includes one or more execution units (EUs) 508a, while processor core 502a includes one or more EU's 508b. Similarly, each processor core 502 includes elements shown for processor core 204, including but not limited to the GPRs 220 shown in FIG. 2. In the example shown in FIG. 5, each of the processor cores 502a-b has their own L-1 I-Cache (504a or 504b) and L1 D-Cache (506a or 506b). However, as depicted, the two cores 502a-b share an L-2 Cache 510 (as well as lower level memory, not shown in FIG. 5, but shown in FIG. 3).

As suggested in FIG. 5, processor core 502a is initially executing a first main thread partition (main thread partition 404a shown in FIG. 4) while processor core 502b is executing a second helper thread partition (helper thread partition 404b shown in FIG. 4). When the main thread partition 404a completes execution, the second partition of the main thread (main thread partition 404b shown in FIG. 4) starts executing. At this point, the helper thread partition 408b has "warmed up" the L-1 I-Cache 504b, L-1 D-Cache 506b, and/or L-2 Cache 510 with at least some of the data that is needed to execute the second partition (main thread partition 404b). While the main thread partition 404b is now running (presumably faster) with the warmed up caches in the second processor core (502b), the third partition of the helper thread (helper thread partition 408c) is now running in the first process core 502a, warming up the L-1 I-Cache 504a and the L-1 D-Cache 506a. The main process thus switches back and forth between the two processor cores, such that each time a new partition starts, that new partition will have warmed up caches to work with.

Note that as the main thread switches from the first processor core 502a to the second processor core 502b (and back again in subsequent iterations), the L-1 D-Caches 506a-b must have closure and architected states need to be migrated to the cores. Similarly, when utilizing the shared L-2 cache 510, cache coherency (e.g., using a Modified-Shared-Exclusive-Invalid (MESI) or similar type of cache coherency protocol) should be maintained between the two processor cores 502a-b. Additionally in a multiprogrammed environment, the OS scheduler needs to reserve a core for the helper thread.

Figure 6:
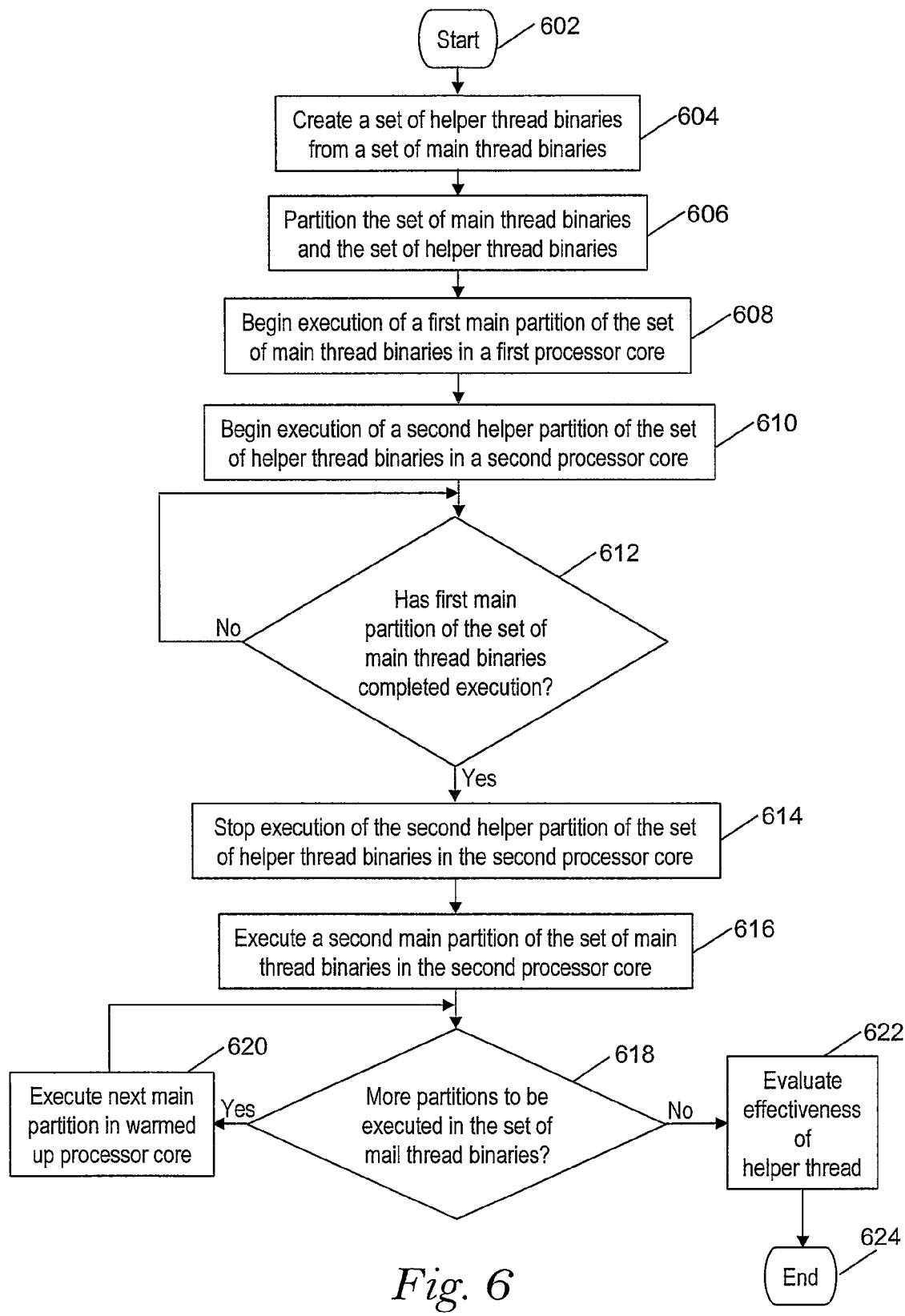
FIG. 6 is a high-level logical flowchart of an exemplary set of steps performed to partition thread binaries and to utilize the set of helper thread binaries to pre-fetch data needed by the set of main thread binaries.

With reference now to FIG. 6, a high-level flow-chart of steps taken to utilize a helper thread in multiple cores is presented. After initiator block 602, a set of helper thread binaries is created by an operating system from a set of main thread binaries (block 604). This step can be performed by simply making a clone copy of the set of main thread binaries (after they have been compiled from source code and linked from object code). In one embodiment, the multiple cores are instructed to not allow instructions from the helper thread to modify system memory or the cores' Input/Output (I/O) register space. Each of the main and helper thread binary sets are then partitioned in a manner that causes each partition to start at a same point in the process thread (block 606). Execution of the first main partition from the main thread begins in a first processor core (block 608) while execution of the second helper partition from the helper thread begins in the second processor core (block 610).

Once the first main partition has completed executing in the first processor core (query block 612), the second helper thread stops executing in the second core (block 614) and the second main partition starts executing in the second processor core using the warmed up cache in the second core (block 616). If the entire main process has not completed execution (query block 618), the process continues in an iterative manner (block 620) switching the execution of the main process back and forth between processor cores (using the caches that have been warmed up by the next helper thread partitions).

Once the entire main process has completed executing, the effectiveness of using the helper thread is evaluated (block 622). That is, a comparison can be made by running the main thread binaries with and without using a helper thread to warm up the cache in another core as describe above. If the time taken to context switch, and the commandeering of resources from the second processor core (which could be used by other processes) is too extensive, then it may be more efficient to simply run the main thread binaries alone on a single core. If so, then future use of helper thread binaries may be prohibited by a policy decision. However, if usage of the helper thread binaries, in a manner described herein, is efficient, then helper thread binaries should be used in the future. The exemplary process ends at terminator block 624.

Note that in one embodiment described above, in which the multiple main thread partitions are identical to the multiple helper thread partitions, the second core is prohibited from allowing instructions from the set of helper thread binaries to communicate data to an Input/Output register in the multi-core computer system, or to modify a content of system memory in the multi-core computer system. This limitation on the set of helper thread binaries can be accomplished by a same logic (e.g., a modified operating system) that controls the back-and-forth switching of execution between the two processor cores described above, or by a dedicated logic (e.g., a software or hardware interface) that limits the helper thread's ability to communicate data to the Input/Output register or to modify the content of system memory in the multi-core computer system.

Although aspects of the present invention have been described with respect to a computer processor and software, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to preferred embodiments thereof, it will be apparent that modifications and variations are possible without departing from the scope of the invention defined in the appended claims.

What is claimed is:

1. A method of retrieving data for use when executing a process thread, the method comprising:

creating a set of helper thread binaries from a set of main thread binaries;

partitioning the set of main thread binaries into multiple main thread partitions;

partitioning the set of helper thread binaries into multiple helper thread partitions, wherein each partition in the multiple helper thread partitions begins at a same instruction found in a corresponding partition in the multiple main thread partitions;

executing a first main partition from the multiple main thread partitions in a first core of a multi-core computer system;

executing a second helper partition from the multiple helper thread partitions in a second core of the multi-core computer system;

in response to the first main partition completing execution, executing a second main partition from the multiple main thread partitions in the second core, wherein the second main partition utilizes data that has been retrieved during execution of at least part of the second helper partition in the second core;

a processor determining an effectiveness of the set of helper thread binaries by:

executing the set of main thread binaries using the set of helper thread binaries;

executing the set of main thread binaries without using the set of helper thread binaries;

measuring a length of time required to execute the set of main thread binaries using the helper thread binaries and a length of time required to execute the set of main thread binaries without using the set of helper thread binaries, wherein the length of time required to execute the set of main thread binaries using the set of helper thread binaries also includes a time taken to context switch and a time taken commandeering resources from the second core;

comparing the length of time required to execute the set of main thread binaries using the set of helper thread binaries and the length of time required to execute the set of main thread binaries without using the set of helper thread binaries;

determining, based on the comparing, if executing the set of main thread binaries using the set of helper thread binaries took longer than executing the set of main thread binaries without using the set of helper thread binaries; and in response to determining that executing the set of main thread binaries using the set of helper thread binaries took longer than executing the set of main thread binaries without using the set of helper thread binaries, prohibiting a future use of all helper thread binaries when executing the set of main thread binaries for the process thread.

2. The method of claim 1, wherein the first core and the second core are in different processors.

3. The method of claim 1, wherein the first core and the second core are in a same processor.

4. The method of claim 1, wherein the first core and the second core share access to an L-2 cache, and wherein the second main partition from the multiple main thread partitions is executed using data in the L-2 cache that has been retrieved by executing at least part of the second helper partition.

5. The method of claim 1, wherein the multiple main thread partitions are identical to the multiple helper thread partitions, and wherein the multi-core computer system does not allow instructions from the set of helper thread binaries to communicate data to an Input/Output register in the multi-core computer system, and wherein the multi-core computer system does not allow instructions from the set of helper thread binaries to modify a content of system memory in the multi-core computer system.

6. A system comprising:
a processor;
a data bus coupled to the processor;
a memory coupled to the data bus; and
a computer-usable medium embodying computer program code, the computer program code comprising instructions executable by the processor and configured for retrieving data for use when executing a process thread by:

creating a set of helper thread binaries from a set of main thread binaries;

partitioning the set of main thread binaries into multiple main thread partitions;

partitioning the set of helper thread binaries into multiple helper thread partitions, wherein each partition in the multiple helper thread partitions begins at a same instruction found in a corresponding partition in the multiple main thread partitions;

executing a first main partition from the multiple main thread partitions in a first core of a multi-core computer system;

executing a second helper partition from the multiple helper thread partitions in a second core of the multi-core computer system;

in response to the first main partition completing execution, executing a second main partition from the multiple main thread partitions in the second core, wherein the second main partition utilizes data that has been retrieved during execution of at least part of the second helper partition;

determining an effectiveness of the set of helper thread binaries by:

executing the set of main thread binaries using the set of helper thread binaries;

executing the set of main thread binaries without using the set of helper thread binaries;

measuring a length of time required to execute the set of main thread binaries using the helper thread binaries and a length of time required to execute the set of main thread binaries without using the set of helper thread binaries, wherein the length of time required to execute the set of main thread binaries using the set of helper thread binaries also includes a time taken to context switch and a time taken commandeering resources from the second core;

comparing the length of time required to execute the set of main thread binaries using the set of helper thread binaries and the length of time required to execute the set of main thread binaries without using the set of helper thread binaries;

determining, based on the comparing, if executing the set of main thread binaries using the set of helper thread binaries took longer than executing the set of main thread binaries without using the set of helper thread binaries; and in response to determining that executing the set of main thread binaries using the set of helper thread binaries took longer than executing the set of main thread binaries without using the set of helper thread binaries, prohibiting a future use of all helper thread binaries when executing the set of main thread binaries for the process thread.

7. The system of claim 6, wherein the first core and the second core are in different processors.

8. The system of claim 6, wherein the first core and the second core are in a same processor.

9. The system of claim 6, wherein the first core and the second core share access to an L-2 cache, and wherein the second main partition from the multiple main thread partitions is executed using data in the L-2 cache that has been retrieved by executing at least part of the second helper partition.

10. The system of claim 6, wherein the multiple main thread partitions are identical to the multiple helper thread partitions, and wherein the second core does not allow instructions from the set of helper thread binaries to communicate data to an Input/Output register, and wherein the second core does not allow instructions from the set of helper thread binaries to modify a content of system memory in the multi-core computer system.

11. A computer-readable storage medium having a plurality of instructions processable by a machine, wherein the plurality of instructions, when processed by the machine, causes the machine to retrieve data for use when executing a process thread by performing the functionality of:

creating a set of helper thread binaries from a set of main thread binaries;

partitioning the set of main thread binaries into multiple main thread partitions;

partitioning the set of helper thread binaries into multiple helper thread partitions, wherein each partition in the multiple helper thread partitions begins at a same instruction found in a corresponding partition in the multiple main thread partitions;

executing a first main partition from the multiple main thread partitions in a first core of a multi-core computer system;

executing a second helper partition from the multiple helper thread partitions in a second core of the multi-core computer system;

in response to the first main partition completing execution, executing a second main partition from the multiple main thread partitions in the second core, wherein the second main partition utilizes data that has been retrieved during execution of at least part of the second helper partition;

determining an effectiveness of the set of helper thread binaries by:

executing the set of main thread binaries using the set of helper thread binaries;

executing the set of main thread binaries without using the set of helper thread binaries;

measuring a length of time required to execute the set of main thread binaries using the helper thread binaries and a length of time required to execute the set of main thread binaries without using the set of helper thread binaries, wherein the length of time required to execute the set of main thread binaries using the set of helper thread binaries also includes a time taken to context switch and a time taken commandeering resources from the second core;

comparing the length of time required to execute the set of main thread binaries using the set of helper thread binaries and the length of time required to execute the set of main thread binaries without using the set of helper thread binaries;

determining, based on the comparing, if executing the set of main thread binaries using the set of helper thread binaries took longer than executing the set of main thread binaries without using the set of helper thread binaries; and in response to determining that executing the set of main thread binaries using the set of helper thread binaries took longer than executing the set of main thread binaries without using the set of helper thread binaries, prohibiting a future use of all helper thread binaries when executing the set of main thread binaries for the process thread.

12. The computer-readable storage medium of claim 11, wherein the first core and the second core are in different processors.

13. The computer-readable storage medium of claim 11, wherein the first core and the second core are in a same processor.

14. The computer-readable storage medium of claim 11, wherein the first core and the second core share access to an L-2 cache, and wherein the second main partition from the multiple main thread partitions is executed using data in the L-2 cache that has been retrieved by executing at least part of the second helper partition.

* * * * *